United States Patent
Dixon et al.

(10) Patent No.: US 8,656,155 B2
(45) Date of Patent: Feb. 18, 2014

(54) DYNAMIC GENERATION AND PROCESSING OF CERTIFICATE PUBLIC INFORMATION DIRECTORIES

(75) Inventors: Bret W. Dixon, South Perth (AU); Scot W. Dixon, South Perth (AU)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 13/370,892

(22) Filed: Feb. 10, 2012

(65) Prior Publication Data

US 2013/0212379 A1    Aug. 15, 2013

(51) Int. Cl.
*H04L 29/06* (2006.01)

(52) U.S. Cl.
USPC ........... 713/156; 713/155; 713/158; 713/168; 713/175; 713/193; 380/278; 380/279; 705/51; 726/2; 726/16; 726/27; 726/29; 709/243; 709/244

(58) Field of Classification Search
USPC ........................................ 713/156
See application file for complete search history.

(56) References Cited

U.S. PATENT DOCUMENTS

| | | | | |
|---|---|---|---|---|
| 5,774,552 A | * | 6/1998 | Grimmer | 713/156 |
| 7,703,128 B2 | | 4/2010 | Cross et al. | |
| 8,374,354 B2 | * | 2/2013 | Berggren | 380/279 |
| 8,452,958 B2 | * | 5/2013 | Sun et al. | 713/158 |
| 2002/0004773 A1 | * | 1/2002 | Xu et al. | 705/36 |
| 2003/0028495 A1 | * | 2/2003 | Pallante | 705/78 |
| 2003/0191843 A1 | * | 10/2003 | Balissat et al. | 709/227 |
| 2005/0289644 A1 | | 12/2005 | Wray | |
| 2008/0256358 A1 | | 10/2008 | Wilkie et al. | |

* cited by examiner

*Primary Examiner* — Nathan Flynn
*Assistant Examiner* — Bryan Wright
(74) *Attorney, Agent, or Firm* — Lee Law, PLLC; Christopher B. Lee

(57) ABSTRACT

Digital certificate public information is extracted using a processor from at least one digital certificate stored within at least one digital certificate storage repository. The extracted digital certificate public information is stored to at least one dynamically-created certificate public information directory. At least a portion of the digital certificate public information stored within the at least one dynamically-created certificate public information directory is provided in response to a digital certificate public information request.

17 Claims, 6 Drawing Sheets

DYNAMIC GENERATION AND PROCESSING OF CERTIFICATE PUBLIC INFORMATION DIRECTORIES

BACKGROUND

The present invention relates to digital certificates. More particularly, the present invention relates to dynamic generation and processing of certificate public information directories.

Digital certificates, such as those based upon the X.509 standard used in a public key infrastructure (PKI), may associate an identity or distinguished name (DN) with a public and private key pair. The public and private key pair is used to encrypt and decrypt data communicated between two entities, such as for client and server applications.

In some cases, digital certificates are used to both sign and encrypt data using a public-key cryptographic standard (PKCS), such as PKCS#7. Data that has been digitally signed in this case uses the private key of the originator (or sender) of the data and the data is verified by the recipient using the public key of the sender's certificate and possibly the issuer certificate (the certificate used to "sign" the sender's certificate). Data that is encrypted utilizes the public key of the intended recipient to encrypt the data for that particular recipient, and the recipient uses the private key of the recipient to decrypt the data.

BRIEF SUMMARY

A method includes extracting, via a processor, digital certificate public information from at least one digital certificate stored within at least one digital certificate storage repository; storing the extracted digital certificate public information to at least one dynamically-created certificate public information directory; and providing at least a portion of the digital certificate public information stored within the at least one dynamically-created certificate public information directory in response to a digital certificate public information request.

A system includes a memory and a processor programmed to extract digital certificate public information from at least one digital certificate stored within at least one digital certificate storage repository; store the extracted digital certificate public information to at least one dynamically-created certificate public information directory within the memory; and provide at least a portion of the digital certificate public information stored within the at least one dynamically-created certificate public information directory in response to a digital certificate public information request.

A computer program product includes a computer readable storage medium including computer readable program code, where the computer readable program code when executed on a computer causes the computer to extract digital certificate public information from at least one digital certificate stored within at least one digital certificate storage repository; store the extracted digital certificate public information to at least one dynamically-created certificate public information directory; and provide at least a portion of the digital certificate public information stored within the at least one dynamically-created certificate public information directory in response to a digital certificate public information request.

DETAILED DESCRIPTION

Figure 1:
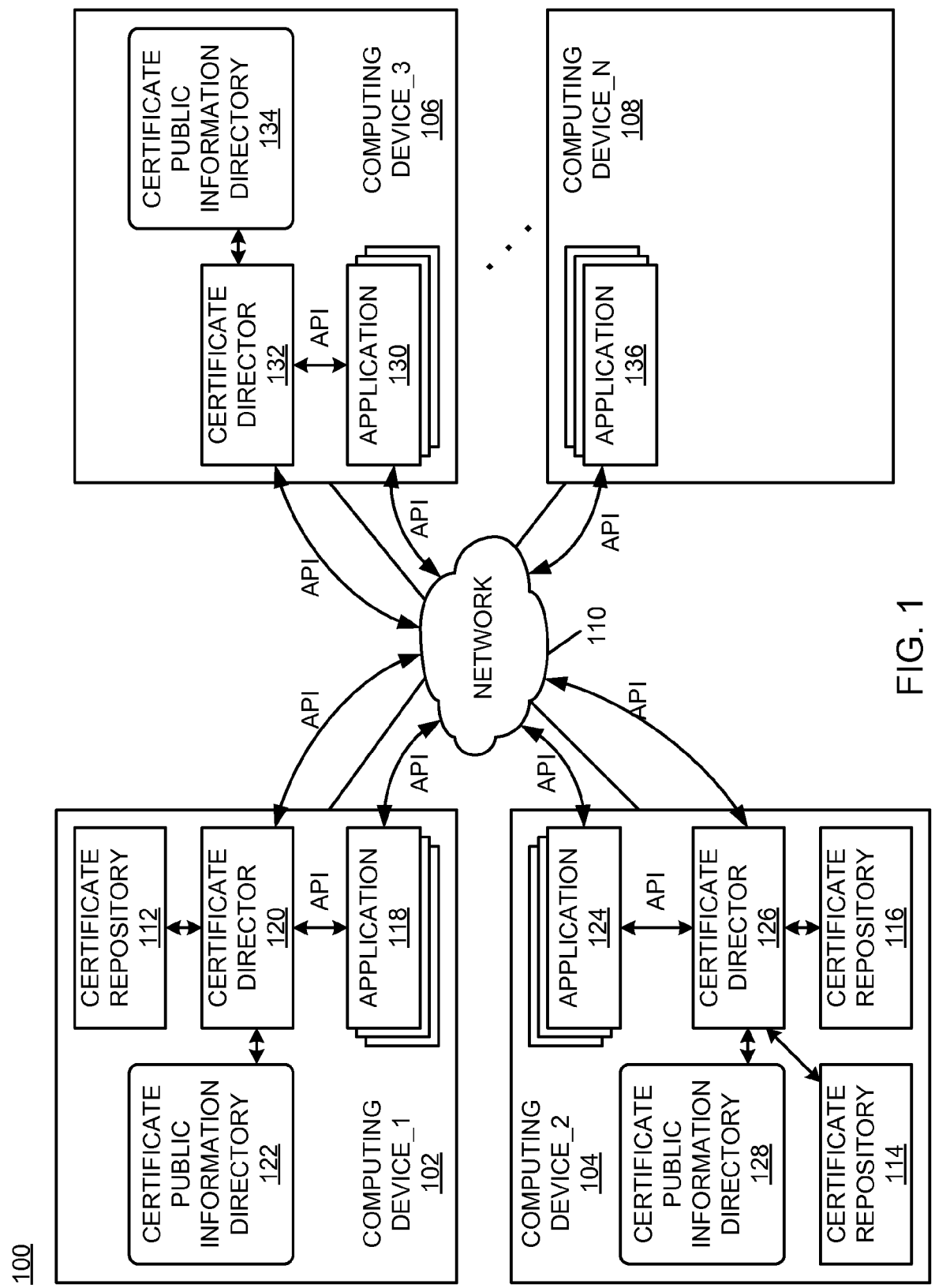
FIG. 1 is a block diagram of an example of an implementation of a system for providing dynamic generation and processing of certificate public information directories according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides dynamic generation and processing of certificate public information directories. The certificate public information directories store and host public information for digital certificates that physically reside/remain in digital certificate storage repositories (e.g., stores) that are physically distributed across a network. Certificate director modules extract digital certificate public information from digital certificates stored within the digital certificate storage repositories. The certificate director modules store the extracted digital certificate public information to a dynamically-created certificate public information directory and register the stored certificate public information for access by applications and other certificate directors. The digital certificate public information stored within the dynamically-created certificate public information directory is provided in response to requests for the stored digital certificate public information. The requests for the digital certificate public information are performed via a certificate query application programming interface (API) that is optimized specifically for digital certificate public information storage and retrieval from certificate public information directories. The certificate query API provides a common interface for access to digital certificate public information within certificate public information directories. The certificate query API is independent of the underlying variety of diversely formatted storage formats for storage of digital certificates and access protocols for access to the digital certificates within the distributed digital certificate storage repositories.

The extraction of the digital certificate public information from digital certificate storage repositories and storage to certificate public information directories may be performed in response to a variety of events, such as in response to requests for digital certificate public information from applications or other certificate directors, as described in more detail below. These events may be triggered via the certificate query API. Additionally, extraction of the digital certificate public information from digital certificate storage repositories local to a certificate director and storage within a local certificate public information directory managed by the certificate director may be performed as part of an initial load operation/event for the certificate public information directory. The initial load operation/event may be managed by repository-specific code that handles the initial load operation. The digital certificate public information may subsequently be distributed using the certificate query API, as described above and in more detail below.

Certificate director modules operate to dynamically create the certificate public information directories in response to a variety of events. For example, the certificate director modules may autonomously create certificate public information directories for provisioning or other purposes. Alternatively, the certificate director modules may dynamically create a certificate public information directory in response to a request for digital certificate public information from an application or another certificate director associated with a digital certificate stored within a digital certificate storage repository managed by the certificate director. As another alternative, the certificate directors may dynamically create a certificate public information directory during a migration operation of certificate public information from one or more remote certificate directors for local access by applications residing on the same device as the certificate directors. Additionally, certificate directors may distribute all or a portion of digital certificate public information from a locally-managed certificate public information directory to one or more remote certificate directors. Other variations on configurations and certificate public information directory processing are possible and all are considered within the scope of the present subject matter.

A cluster of one or more distributed dynamically-generated certificate public information directories may be provided. Certificate public information directories may be provided locally to applications that access digital certificate public information, while the digital certificate storage repositories may be located remotely from the applications. The certificate query API may be used by application programs or certificate directors to access digital certificate public information in a certificate public information directory that is located either locally or remotely relative to the application programs or certificate directors. As such, local access to certificate public information may be provided without transfer and importation of the actual distributed digital certificates. When implemented locally, the performance implications of cross-network traffic are eliminated. Accordingly, network bandwidth consumption may be reduced for application retrieval of digital certificate public information and additional local storage for digital certificates is not required. Further, import and export of digital certificates is not required and the logic of data-protection services that use the digital certificates may be streamlined using the certificate query API.

The certificate query API is a programmatic service callable by application programs and certificate directors. The certificate query API provides callable entry points for the extraction of certificate data managed by certificate directors. The certificate query API involves a prescribed set of requests and replies. This prescribed set of requests and replies are parameter-oriented, and are used by the certificate query API to determine what data is to be extracted from the certificate public information directory, and how it is to be returned to the caller of the API that issued the request for certificate public information.

The certificate public information stored within the certificate public information directories is stored in a structure that is interpretable by the certificate director, and is optimized for retrieval by digital certificate attribute. For example, a certificate public key, subject distinguished name (SDN), issuer distinguished name (IDN), certificate label, or other fields may be individually accessed. The certificate public information directories may be keyed by attribute values, may be ordered alphanumerically, or may be configured otherwise as appropriate for a given implementation. As such, access to certificate public information may be granular and tailored to the particular implementation without departure from the scope of the present subject matter.

A registry of certificate public information stored within certificate public information directories may be provided. Certificate directors may publish these registries for use by applications and other certificate directors. The registry of available certificate public information may be accessed by the certificate query API. As such, applications and other certificate directors may readily determine which certificate director(s) have specific items of certificate public information for individual digital certificates.

Certificate public information stored within certificate public information directories may be refreshed, either manually or in an automated manner on a configurable time interval or schedule. Alternatively, certificate directors may be configured to update certificate public information stored within certificate public information directories as digital certificate public information changes within the digital certificate storage repositories. In such a situation, digital certificates stored within the digital certificate storage repositories may be monitored to determine changes, or configuration data associated with the digital certificates may be added to the entries within the certificate public information directories for the respective digital certificate public information and this configuration data may be used to determine when to refresh the stored certificate public information. As such, the certificate public information directories may be maintained with current certificate public information as that information changes for the respective digital certificates.

Digital certificate public information directories may be temporarily dynamically created for use and the storage later reclaimed for other uses. Alternatively, digital certificate public information directories may be dynamically created for permanent usage as appropriate for a given implementation. The present subject matter does not require pre-loading of a single certificate public information directory with relevant digital certificate public information. The digital certificate public information may be dynamically retrieved and certificate public information directories may be dynamically constructed to migrate certificate public information in real-time as information is requested by applications or certificate directors, which reduces administrative complexity and overhead.

The technology described herein provides an environment where applications and certificate directors may retrieve digital certificate public information as needed using the certificate query API. As such, the present subject matter is well-suited for asynchronous (e.g., non-connection oriented) communication environments because digital certificate public information may be retrieved from certificate public information directories in real-time and without the provisioning involved for importation of digital certificates. However, it should be understood that the present subject matter may also be applied to synchronous communication environments as appropriate for a given implementation. Accordingly, improved digital certificate management and digital certificate public information access for a variety of system implementations may be obtained through use of the present subject matter.

It should be noted that conception of the present subject matter resulted from recognition of certain limitations associated with digital certificate management. For example, it was observed that for either signing or encrypting of data under conventional systems, the digital certificates involved must be available locally to the service providing the relevant data-protection services. However, it was recognized that when distributing protected data over a network, it is often the case that the digital certificates are also distributed across the network and not necessarily available locally. Consequently, it was recognized that it is necessary with conventional systems to import and export the actual digital certificates on relevant nodes/devices in the network to ensure the appropriate digital certificates are available when needed by the data-protection service, which involves manual administrative pre-loading of digital certificates to make them available to applications. It was determined that this processing may become a complex and time consuming task for administrators when the number of digital certificates involved reaches hundreds or thousands of digital certificates. It was additionally observed that nodes/devices in a network may have different services for physically storing digital certificates and that each may have different access formats and protocols for accessing digital certificate data. For example, it was observed that a digital certificate store/repository may be a system authorization facility (SAF) key ring managed by a resource access control facility (RACF) on a z/OS® operating system, may be a key store database on a Linux® operating system, may be a Java™ Key Store (JKS) file on a Windows® operating system, or may use other formats/protocols. It was determined, in conjunction with the observations above, that this variation of storage and access formats adds complexity to the management of digital certificates and to the logic of data-protection services that use the digital certificates. It was additionally observed that there were no available services or application programming interfaces (APIs) specifically optimized for the retrieval of public certificate data/information (e.g., extraction of a digital certificate label, issuer, etc.).

The present subject matter improves digital certificate management and digital certificate public information access by providing dynamic generation and processing of certificate public information directories. The flexibility of distribution and availability of digital certificate public information eliminates cross-network request/reply traffic for digital certificate public information when directories are implemented local to applications. The optimized certificate query API provides for digital certificate public information extraction from the certificate public information directories in real-time and as requested by applications and certificate directors.

For purposes of the present subject matter, the phrases "dynamic generation" and "dynamic creation," including variations of these phrases used in different sentence structures, may be considered synonymous. Additionally, it is understood that the phrase "digital certificate" and "certificate" are used interchangeably.

The dynamic generation and processing of certificate public information directories described herein may be performed in real time to allow prompt migration and access to digital certificate public information. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for providing dynamic generation and processing of certificate public information directories. It should be noted that, in addition to device interconnections, FIG. 1 illustrates certain logical relationships between devices and components that are operatively implemented via a certificate query application programming interface (API), as described above and more detail below. For purposes of the description below, the certificate query API is considered operative between any application and one or more certificate director modules that provide digital certificate public information (e.g., subject distinguished name (DN), issuer DN, label, or any other digital certificate attributes, etc.). Logical interconnections labeled API within FIG. 1 illustrate possible communication pathways between applications and certificate directors that are illustrated within the system 100 and described in detail below.

As will be described in more detail below in association with FIG. 2 through FIG. 5, a computing device_1 102 through a computing device_N 108 provide automated dynamic generation and processing of certificate public information directories. The automated dynamic generation and processing of certificate public information directories is based upon dynamic creation of certificate public information directories that store and provide access to public information associated with distributed digital certificate repositories. The automated dynamic generation and processing of certificate public information directories may be performed, for example, in real-time in response to requests for public information by applications that communicate asynchronously, or may be performed in response to device/network configuration operations and/or changes to certificate public information processing demands within a group of devices. In response to such requests, public information associated with digital certificates stored within distributed digital certificate repositories may be migrated to the dynamically-created certificate public information directories and access to the public information associated with the digital certificates may be provided from within the dynamically-created certificate public information directories.

Within FIG. 1, the computing device_1 102, the computing device_2 104, the computing device_3 106, and the computing device_N 108 communicate via a network 110. The computing device_1 102 through the computing device_N 108 are provided for purposes of illustration. It is understood that the present subject matter may be applied to one or more computing devices as appropriate for a given implementation.

Regarding digital certificate stores/repositories within the system 100 of FIG. 1, the computing device_1 102 hosts a certificate repository 112. The computing device_2 104 hosts two certificate repositories, a certificate repository 114 and a certificate repository 116. For purposes of the present example, all digital certificates that are used within the example system 100 are stored within one of these certificate repositories. The certificate repository 112 through the certificate repository 116 may be diverse in type. For example, the certificate repository 112 through the certificate repository 116 may include a system authorization facility (SAF) key ring managed by a resource access control facility (RACF) on a z/OS® operating system, a key store database on a Linux® operating system, a Java™ Key Store (JKS) file on a Windows® operating system, or may include other formats/protocols as appropriate for the given implementation. As described above and in more detail below, applications that execute at one of the computing device_1 102 through the computing device_N 108 may access public information associated with the stored digital certificates without migration or importation of the actual digital certificates.

As can be seen from FIG. 1, each of the computing device_1 102 through the computing device_N 108 is configured slightly differently for purposes of the present example. However, it is understood that many variations on configurations are possible based upon the present subject matter. Accordingly, all such configurations are considered within the scope of the present subject matter.

Regarding configuration of the computing device_1 102, the computing device_1 102 hosts one or more applications 118. The applications 118 may interface via the certificate query API with a certificate director module 120 or with any other certificate director within the system 100, as described in more detail below, to obtain certificate public information associated with digital certificates stored within any of the certificate repository 112 through the certificate repository 116. The certificate director module 120 implements the automated dynamic generation and processing of certificate public information directories described herein within the computing device_1 102. The certificate director module 120 automatically creates within local memory a certificate public information directory 122. The certificate public information directory 122 is configured by the certificate director module 120 and may store digital certificate public information associated with digital certificates stored within one or more of the certificate repository 112 through the certificate repository 116.

Regarding configuration of the computing device_2 104, the computing device_2 104 hosts one or more applications 124. The applications 124 may interface via the certificate query API with a certificate director module 126 or with any other certificate director within the system 100, as described above and in more detail below, to obtain certificate public information associated with digital certificates stored within any of the certificate repository 112, the certificate repository 114, and the certificate repository 116. The certificate director module 126 implements the automated dynamic generation and processing of certificate public information directories described herein within the computing device_2 104. The certificate director module 126 automatically creates within local memory a certificate public information directory 128. The certificate public information directory 128 is configured by the certificate director module 126 and may store digital certificate public information associated with digital certificates stored within one or more of the certificate repository 112 through the certificate repository 116.

Regarding configuration of the computing device_3 106, the computing device_3 106 hosts one or more applications 130. The applications 130 may interface via the certificate query API with a certificate director module 132 or with any other certificate director within the system 100, as described above and in more detail below, to obtain certificate public information associated with digital certificates stored within any of the certificate repository 112 through the certificate repository 116. The certificate director module 132 implements the automated dynamic generation and processing of certificate public information directories described herein within the computing device_3 106. The certificate director module 132 automatically creates within local memory a certificate public information directory 134. The certificate public information directory 134 is configured by the certificate director module 132 and stores digital certificate public information for digital certificates stored within one or more of the certificate repository 112 through the certificate repository 116. As such, the computing device_3 106 illustrates an example implementation of the computing device that does not host a certificate repository. In this case, the certificate director module 132 may load the certificate public information directory 134 with certificate public information from any other certificate director in the system 100 and may make the certificate public information available via the certificate query API to local and remote applications in the system 100.

Regarding configuration of the computing device_N 108, the computing device_N 108 hosts one or more applications 136. The applications 136 may interface via the certificate query API with any certificate director within the system 100, as described above and in more detail below, to retrieve/obtain certificate public information associated with digital certificates stored within any of the certificate repository 112 through the certificate repository 116. As such, the computing device_N 108 represents an example implementation of a device that does not locally implement a certificate director, a certificate public information directory, or a certificate repository.

It should further be noted that each of the applications 118, 124, 130, and 136 may utilize the certificate public information obtained from certificate directors within the system 104 for asynchronous or synchronous communication purposes. As such, a variety of communication possibilities may utilize the automated dynamic generation and processing of certificate public information directories described herein.

The distribution, configuration, and selection of digital certificate public information that is stored within the respective certificate public information directories by the respective certificate directors may be provisioned or may be performed in response to communications initiated by a local application with one or more other remote applications. As such, certificate public information directories may be populated in real time as requests for digital certificate public information are made. Additionally, distribution, configuration, and selection of digital certificate public information may be configured and selected in response to communications initiated by remote applications hosted by other devices within the system 100 that are directed to one or more of the applications hosted by a particular device that hosts a certificate director.

As such, each certificate director within the system 100 optionally loads physically stored digital certificate data (public information) from digital certificates stored within one or more certificate repositories and stores the certificate public information in the respective certificate public information directory associated with that certificate director. Each certificate director may optionally request certificate public information from any other certificate director in the system 100 using the certificate query API and may store that certificate public information in the respective certificate public information directory. Optionally, each certificate director may leave the certificate public information in the respective certificate repository and extract the certificate public information as requested via certificate query API requests for the public information associated with the respective digital certificates. The certificate public information stored within the respective certificate public information directories alleviates application processing for certificate repositories. The certificate public information stored within the respective certificate public information directories is accessible to any application or certificate director in the system 100 using the certificate query API via one or more certificate directors. Accordingly, the certificate directors provide certificate public information to requesting applications and to other certificate directors in the system 100 from its hosted certificate public information directory, which may be created and populated from the respective managed certificate repositories as and when requested via the certificate query API. Certificate public information may be distributed and migrated between certificate public information directories managed by different certificate directors dynamically, as appropriate for each given implementation.

It should be noted that the computing device_1 102 through the computing device_N 108 may be portable computing devices, either by a user's ability to move the respective computing device to different locations, or by the respective computing device's association with a portable platform, such as a plane, train, automobile, or other moving vehicle. It should also be noted that the computing device_1 102 through the computing device_N 108 may be any computing device capable of processing information as described above and in more detail below. For example, the computing device_1 102 through the computing device_N 108 may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The network 110 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
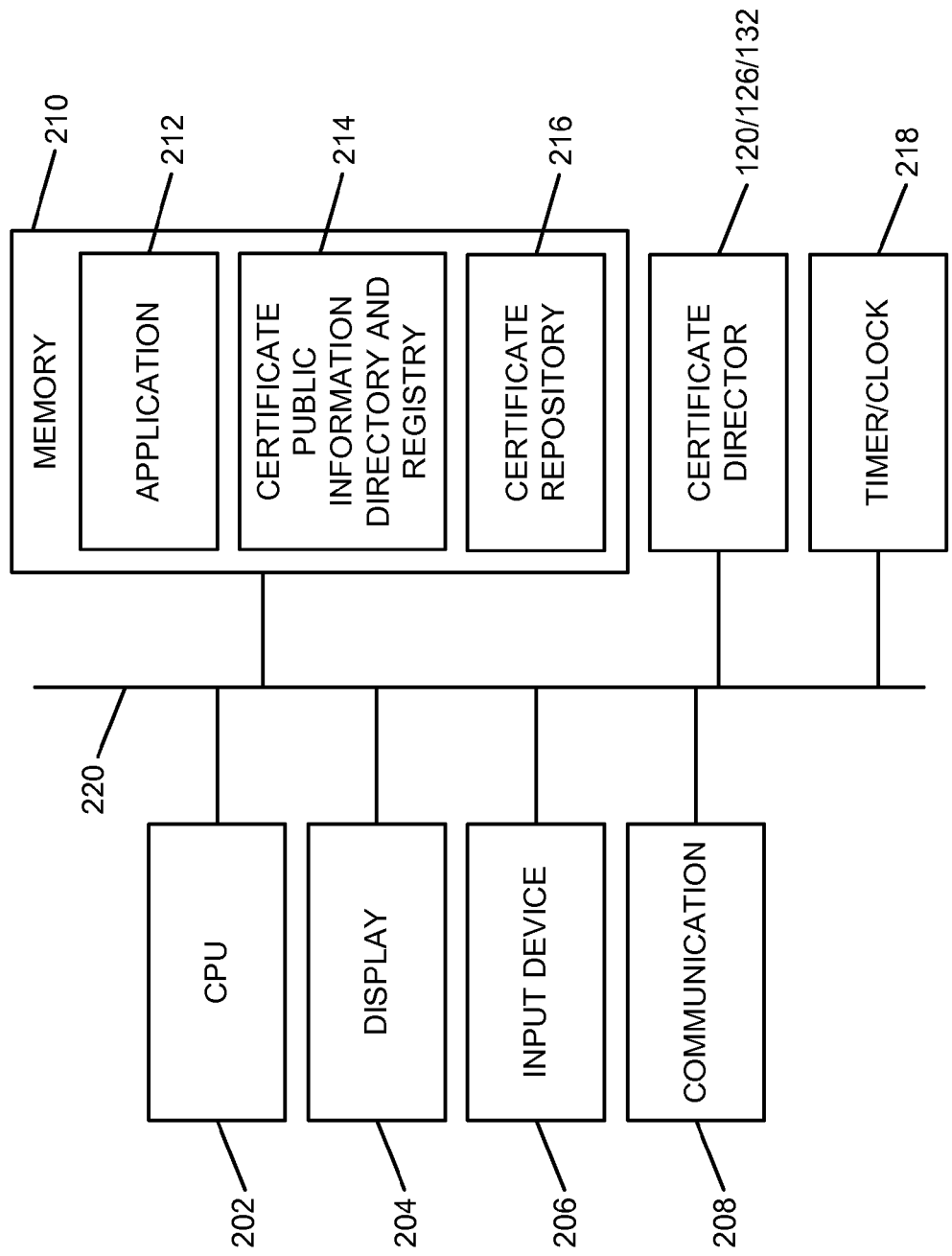
FIG. 2 is a block diagram of an example of an implementation of a core processing module capable of performing automated dynamic generation and processing of certificate public information directories according to an embodiment of the present subject matter.

FIG. 2 is a block diagram of an example of an implementation of a core processing module 200 capable of performing automated dynamic generation and processing of certificate public information directories. The core processing module 200 may be associated with any of the computing device_1 102 through the computing device_N 108, and configured as appropriate for a given implementation. Further, the core processing module 200 may provide different and complementary processing of certificate public information in association with each implementation, as described in more detail below.

As such, for any of the examples above and below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204. It should be noted that the display 204 and input device 206 may be considered optional for certain implementations of certain devices, as appropriate for the given implementation.

A communication module 208 provides interconnection capabilities that allow the core processing module 200 to communicate with other modules within the system 100. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes an application storage area 212 that stores applications, such as the applications 118 of the computing device_1 102, and provides execution space for applications within the core processing module 200. A certificate public information directory and registry storage area 214 stores certificate public information directories, such as the certificate public information directory 122 of the computing device_1 102, and stores a published registry that identifies contents of the certificate public information directory. As described above, the published registry may be accessed via the certificate query API by applications and certificate directors. A certificate repository storage area 216 stores one or more certificate repositories, such as the certificate repository 112 of the computing device_1 102.

It should additionally be noted, as described above in association with FIG. 1, that, for example, a certificate repository and certificate public information directory, such as the certificate repository 112 and the certificate public information directory 122 of the computing device_1 102, are not illustrated within the computing device_N 108. However, it should be understood that memory for storage of certificate repositories and certificate public information directories may be deployed and activated dynamically without departure from the scope of the present subject matter.

The memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A certificate director module 120/126/132 is also illustrated. It is understood that the certificate director module 120/126/132 represents any of the certificate director 120, the certificate director 126, and the certificate director 132 described above in association with FIG. 1, based upon which respective computing device the certificate director module 120/126/132 is implemented within. As such, the naming convention of the certificate director module 120/126/132 is for ease of description purposes.

The certificate director module 120/126/132 provides processing of certificate public information for the core processing module 200, as described above and in more detail below. The certificate director module 120/126/132 implements the automated dynamic generation and processing of certificate public information directories of the core processing module 200.

Though the certificate director module 120/126/132 is illustrated as a component-level module for ease of illustration and description purposes, it should be noted that the certificate director module 120/126/132 may include any hardware, programmed processor(s), and memory used to carry out the functions of this module as described above and in more detail below. For example, the certificate director module 120/126/132 may include additional controller circuitry in the form of application specific integrated circuits (ASICs), processors, and/or discrete integrated circuits and components for performing communication and electrical control activities associated with the respective devices. Additionally, the certificate director module 120/126/132 may include interrupt-level, stack-level, and application-level modules as appropriate. Furthermore, the certificate director module 120/126/132 may include any memory components used for storage, execution, and data processing for performing processing activities associated with the module.

It should also be noted that the certificate director module 120/126/132 may form a portion of other circuitry described without departure from the scope of the present subject matter. Further, the certificate director module 120/126/132 may alternatively be implemented as an application stored within the application storage area 212 of the memory 210. In such an implementation, the certificate director module 120/126/132 may include instructions executed by the CPU 202 for performing the functionality described herein. The CPU 202 may execute these instructions to provide the processing capabilities described above and in more detail below for the core processing module 200. The certificate director module 120/126/132 may form a portion of an interrupt service routine (ISR), a portion of an operating system, a portion of a browser application, or a portion of a separate application without departure from the scope of the present subject matter.

It should additionally be noted, as described above in association with FIG. 1, that, for example, a certificate director such as the certificate director module 120/126/132 is not illustrated within the computing device_N 108. However, it should be understood that certificate directors may be deployed and activated dynamically without departure from the scope of the present subject matter.

A timer/clock module 218 is illustrated and used to determine timing and date information, such as for lifetime and certificate public information management of digital certificates, for refreshing the certificate public information within certificate public information directories. As such, the certificate director module 120/126/132 may utilize information derived from the timer/clock module 218 for information processing activities, such as the automated dynamic generation and processing of certificate public information directories and refreshing contents of the certificate public information directories described herein.

The CPU 202, the display 204, the input device 206, the communication module 208, the memory 210, the certificate director module 120/126/132, and the timer/clock module 218 are interconnected via an interconnection 220. The interconnection 220 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
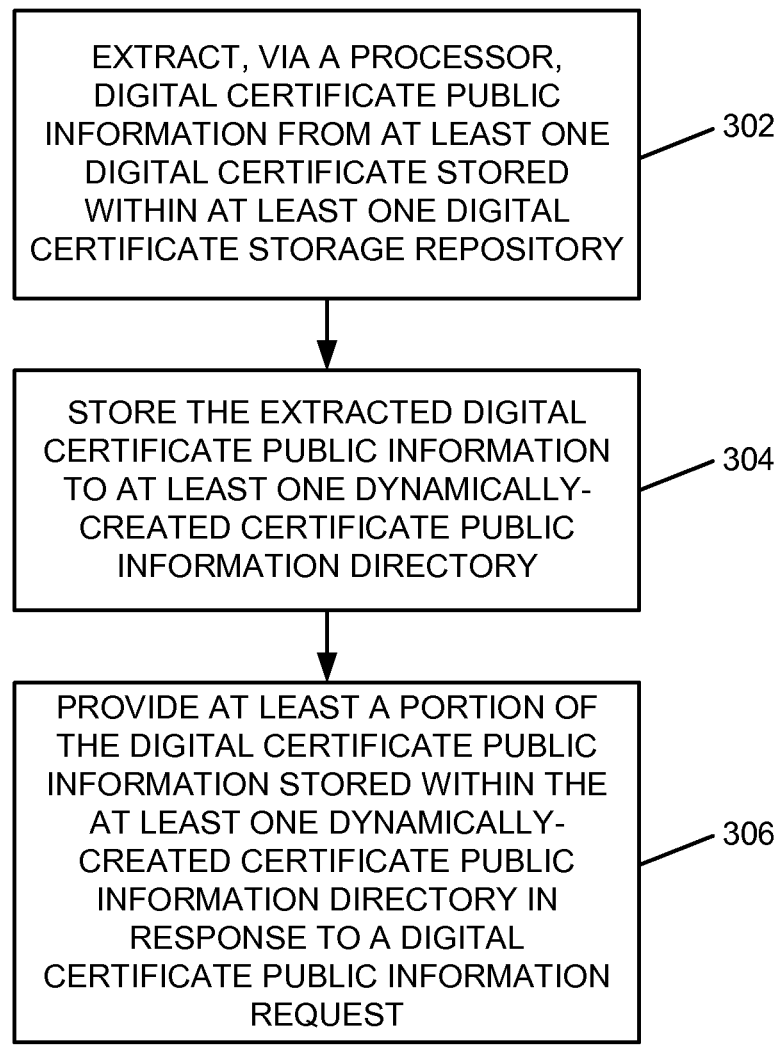
FIG. 3 is a flow chart of an example of an implementation of a process for automated dynamic generation and processing of certificate public information directories according to an embodiment of the present subject matter.
Figure 4A:
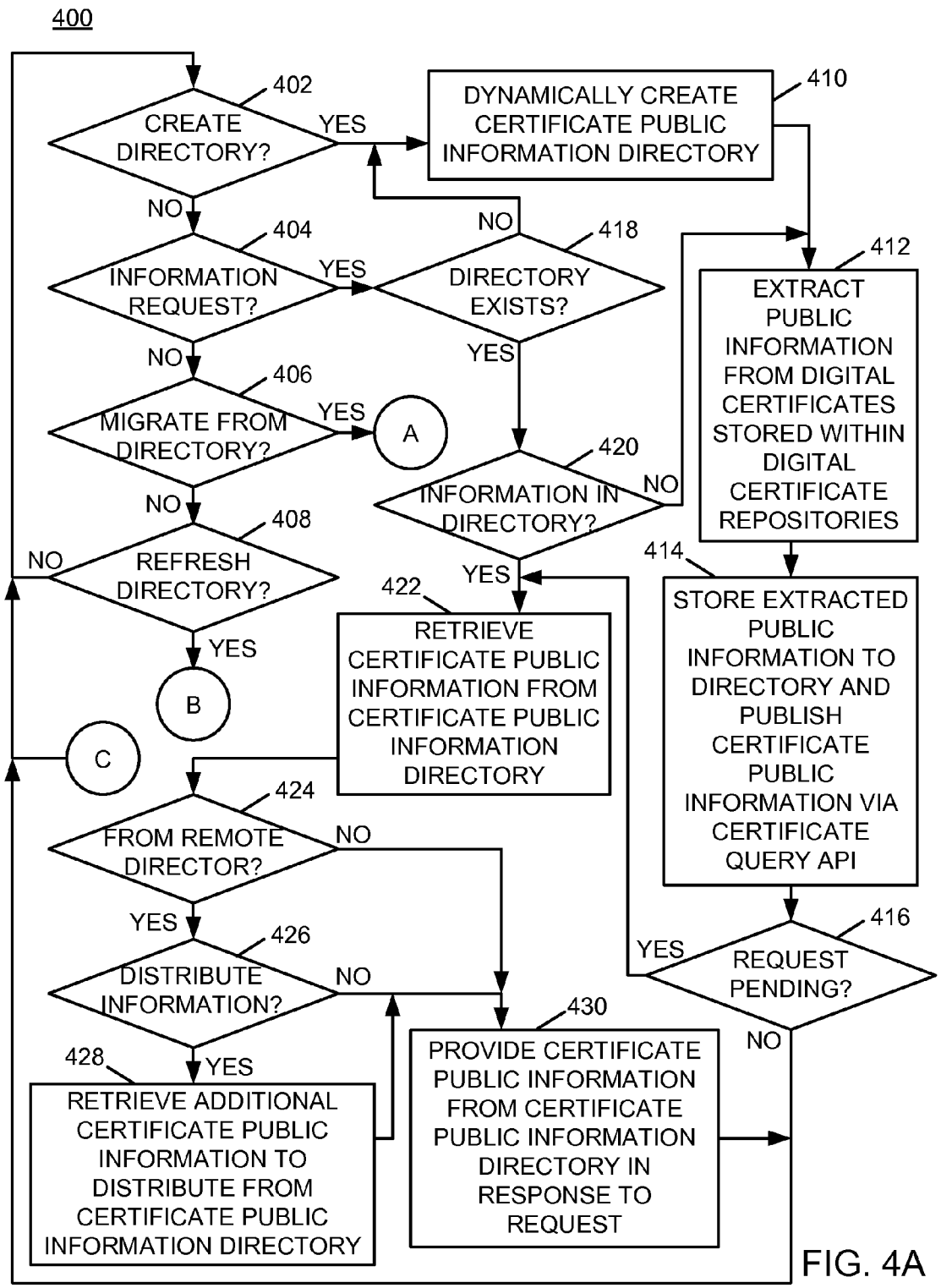
FIG. 4A is a flow chart of an example of an implementation of initial processing within a process for automated dynamic generation and processing of certificate public information directories at a certificate director according to an embodiment of the present subject matter.
Figure 4B:
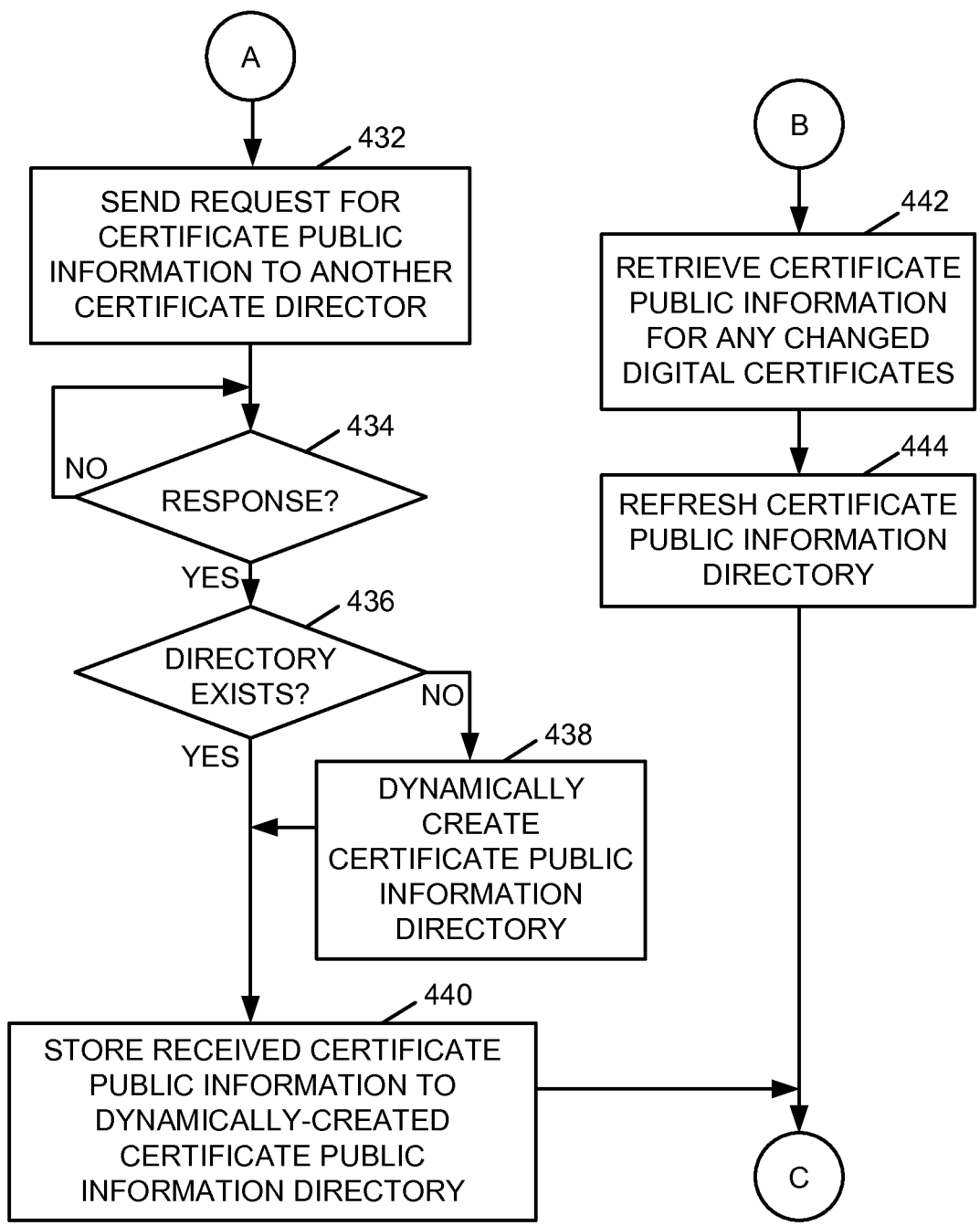
FIG. 4B is a flow chart of an example of an implementation of additional processing within a process for automated dynamic generation and processing of certificate public information directories at a certificate director according to an embodiment of the present subject matter.
Figure 5:
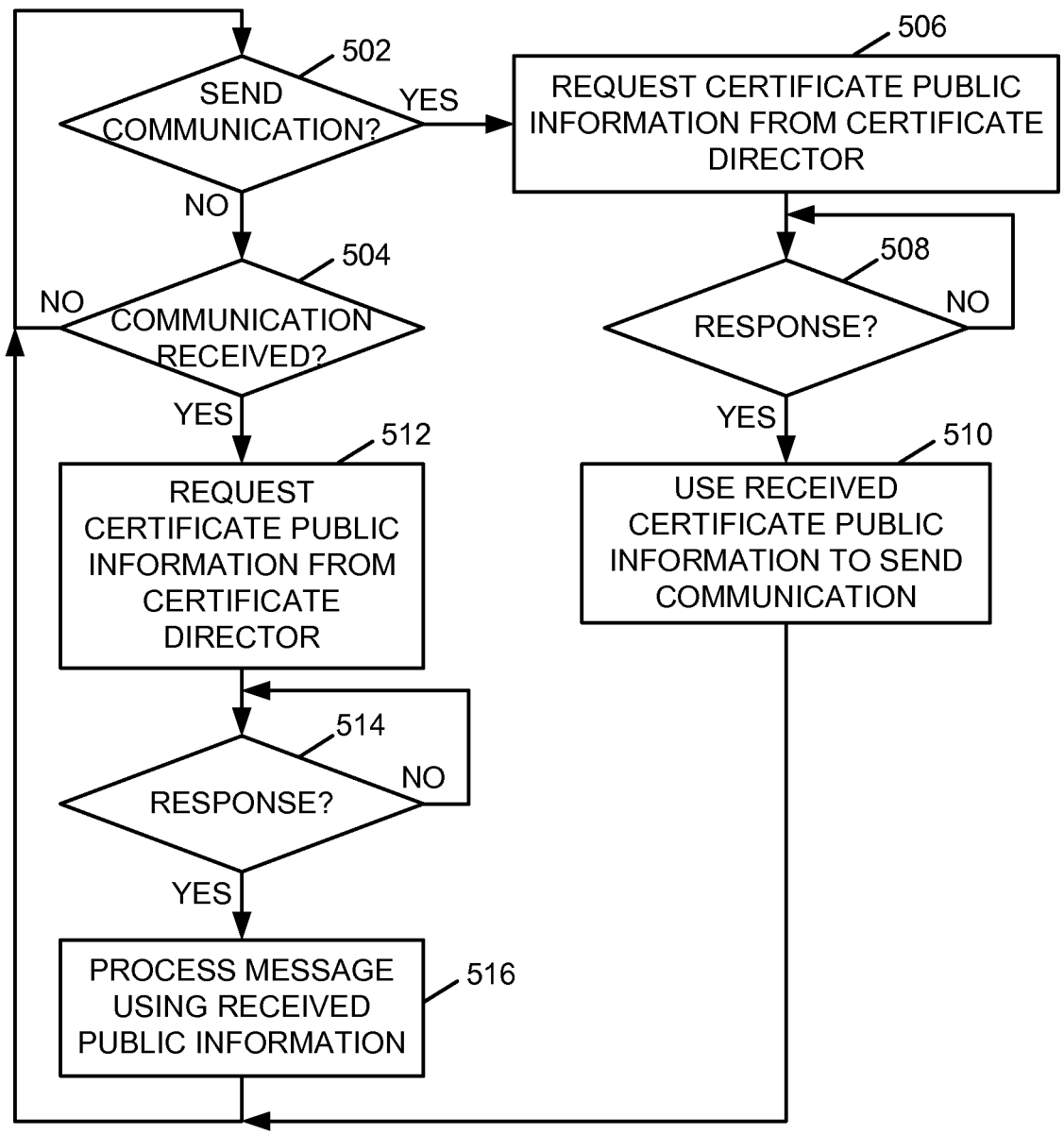
FIG. 5 is a flow chart of an example of an implementation of a process for application processing associated with dynamic generation and processing of certificate public information directories according to an embodiment of the present subject matter.

FIG. 3 through FIG. 5 described below represent example processes that may be executed by devices, such as the core processing module 200, to perform the automated dynamic generation and processing of certificate public information directories associated with the present subject matter. Many other variations on the example processes are possible and all are considered within the scope of the present subject matter. The example processes may be performed by modules, such as the certificate director module 120/126/132 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added without departure from the scope of the present subject matter.

FIG. 3 is a flow chart of an example of an implementation of a process 300 for automated dynamic generation and processing of certificate public information directories. At block 302, the process 300 extract, via a processor, digital certificate public information from at least one digital certificate stored within at least one digital certificate storage repository. At block 304, the process 300 stores the extracted digital certificate public information to at least one dynamically-created certificate public information directory. At block 306, the process 300 provides at least a portion of the digital certificate public information stored within the at least one dynamically-created certificate public information directory in response to a digital certificate public information request.

FIGS. 4A-4B illustrate a flow chart of an example of an implementation of a process 400 for automated dynamic generation and processing of certificate public information directories at a certificate director, such as the certificate director module 120, the certificate director module 126, and the certificate director module 132. FIG. 4A illustrates initial processing within the process 400.

Higher-level processing associate with the process 400 will be initially described followed by a description of processing associated with each higher-level decision point. At decision point 402, the process 400 makes a determination as to whether to create a certificate public information directory. This determination may be request-based, such that creation of a certificate public information directory is performed in response to a request for digital certificate public information associated with a digital certificate stored within a digital certificate storage repository. Alternatively, creation of a certificate public information directory may be performed dynamically in response to a variety of other factors including provisioning operations or other operations, as appropriate for a given implementation.

In response to determining at decision point 402 not to create a certificate public information directory, the process 400 makes a determination at decision point 404 as to whether a digital certificate public information request has been received. A certificate public information request may be received, for example, from an application or from another certificate director.

In response to determining at decision point 404 that a digital certificate public information request has not been received, the process 400 makes a determination at decision point 406 as to whether to migrate certificate public information from another remote certificate public information directory for local storage. This processing may be performed by communicating with a remote certificate director that operates at a remote device and requesting a portion or all of the certificate public information stored and managed by the respective remote certificate director within a certificate public information directory at that remote device. As such, the process 400 may dynamically move certificate public information from remote certificate public information directories for local storage.

In response to determining at decision point 406 not to migrate certificate public information from another remote certificate public information directory for local storage, the process 400 makes a determination at decision point 408 as to whether to refresh certificate public information within a managed certificate public information directory. The process 400 may refresh certificate public information in response to a configured interval or time period, at scheduled times, or in response to changes to the managed certificate public information within the original digital certificates stored within the separate digital certificate repositories. As such, the process 400 may autonomously update certificate public information within a managed certificate public information directory.

In response to determining at decision point 408 not to refresh certificate public information within a managed certificate public information directory, the process 400 returns to decision point 402 and iterates as described above.

Returning to the description of decision point 402, in response to determining to create a certificate public information directory, the process 400 dynamically creates a certificate public information directory at block 410. At block 412, the process 400 extracts digital certificate public information from at least one digital certificate stored within one or more digital certificate storage repositories managed by the respective certificate director. At block 414, the process 400 stores the extracted digital certificate public information to a dynamically-generated (dynamically-created) certificate public information directory and publishes the certificate public information via a registry accessible to the certificate query API. As such, applications and certificate directors may utilize the registry accessible via the certificate query API at the respective certificate directors to determine what digital certificate public information is available within certificate public information directories managed by the respective certificate directors within a system. With the registry information the applications and certificate directors may selectively retrieve all or a portion of the available digital certificate public information from any such certificate director. In the case of certificate director registry access, the respective certificate director may store the retrieved digital certificate public information within a locally-managed certificate public information directory, and may update its registry to include the stored digital certificate public information.

At decision point 416, the process 400 makes a determination as to whether a request for digital certificate public information is pending from another application or another certificate director. Processing for an affirmative determination at decision point 416 will be described below in more detail in association with the description of an affirmative decision at decision point 404. Within the present branch of processing and for purposes of the present portion of the description, it is assumed that there is no pending request for certificate public information from another application or another certificate director. As such, in response to determining at decision point 416 that there is not a request for digital certificate public information pending from another application or another certificate director, the process 400 returns to decision point 402 and iterates as described above.

Returning to the description of decision point 404, in response to determining that a digital certificate public information request has been received, the process 400 makes a determination at decision point 418 as to whether a locally-managed certificate public information directory already exists. In response to determining that a locally-managed certificate public information directory does not already exist, the process 400 returns to block 410 and iterates as described above to dynamically create a local certificate public information directory, subject to additional processing branching from decision point 416 as described in more detail below in view of the pending digital certificate public information request.

In response to determining at decision point 418 that a locally-managed certificate public information directory already exists, the process 400 makes a determination at decision point 420 as to whether the requested digital certificate public information is already stored within the locally-managed certificate public information directory. In response to determining that the requested digital certificate public information is not already stored within the locally-managed certificate public information directory, the process 400 returns to block 412 to extract the requested certificate public information from the respective digital certificate within the respective digital certificate repository in which the digital certificate is stored and to store the extracted certificate public information to the certificate public information directory at block 414 as described above.

It should be noted that the requested digital certificate public information may be stored within a remote digital certificate repository. In this situation, the process 400 may communicate at block 412 with a remote certificate director that hosts the remote digital certificate repository and request the remote certificate director to extract and return the requested digital certificate public information for storage within a local certificate public information directory at block

414. This processing may include accessing a registry of hosted digital certificate public information at one or more remote certificate directors via the certificate query API hosted by each remote certificate director to determine a source for the requested digital certificate public information. This processing may be performed in real time, as described above. It should additionally be noted that in cases where the requested digital certificate public information is not available from the remote certificate director, the process 400 may return an indication that the requested information is not available (e.g., via a message such as "No Information Available"). These communications and processing are omitted from FIG. 4A due to space limitations within the drawing, but are understood to form a portion of FIG. 4A.

As such, the process 400 may dynamically create a certificate public information directory and populate that dynamically-created certificate public information directory with digital certificate public information extracted from digital certificates within locally-managed certificate storage repositories in response to requests for digital certificate public information from applications or other certificate directors.

Returning to the description of decision point 416, during this iteration of processing, the process 400 will determine that there is a pending request for certificate public information. As such, in response to determining at decision point 416 that there is a pending request for certificate public information, or in response to determining that the requested certificate public information is already stored within the certificate information directory at decision point 420, the process 400 retrieves the requested certificate public information from the certificate public information directory at block 422.

At decision point 424, the process 400 makes a determination as to whether the current pending request for certificate public information is from a remote certificate director operating at a remote computing device. In response to determining that the current pending request for certificate public information is from a remote certificate director operating at a remote computing device, the process 400 makes a determination at decision point 426 as to whether to distribute additional certificate public information to the respective remote certificate director. In response to determining to distribute additional certificate public information to the respective remote certificate director, the process 400 retrieves additional certificate public information to distribute from the certificate public information directory at block 428. It should again be noted, as described above, that in cases where the requested digital certificate public information is not available from the remote certificate director, the process 400 may return an indication that the requested information is not available (e.g., via a message such as "No Information Available"). It is again noted that this processing is omitted from FIG. 4A due to space limitations within the drawing, but is understood to form a portion of FIG. 4A.

In response to retrieving the additional certificate public information to distribute from the certificate public information directory at block 428, or in response to determining that the current pending request for certificate public information is not from a remote certificate director operating at a remote computing device at decision point 424, or in response to determining not to distribute additional certificate public information to the respective remote certificate director at decision point 426, the process 400 provides the requested certificate public information retrieved from the certificate public information directory in response to the request and, alternatively, any additional certificate public information to be distributed to the respective remote certificate director at block 430. The process 400 returns to decision point 402 and iterates as described above.

Returning to the description of decision point 406, in response to determining to migrate certificate public information from another remote certificate public information directory for local storage, the process 400 transitions to the processing shown and described in association with FIG. 4B.

FIG. 4B illustrates additional processing associated with the process 400 for automated dynamic generation and processing of certificate public information directories at a certificate director. At block 432, the process 400 sends a request for certificate public information to another certificate director operating a remote computing device. At decision point 434, the process 400 waits for a response from the remote certificate director. When a determination is made that the response has been received, the process 400 makes a determination at decision point 436 as to whether a locally-managed certificate public information directory already exists. In response to determining that a locally-managed certificate public information directory does not already exist, the process 400 dynamically creates a certificate public information directory at block 438. In response to completion of the dynamic creation of the certificate public information directory at block 438 or in response to determining at decision point 436 that a locally-managed certificate public information directory already exists, the process 400 stores the received certificate public information to the dynamically created certificate public information directory at block 440. The process 400 returns to processing described in association with FIG. 4A at decision point 402 and iterates as described above.

Returning to the description of decision point 408 in FIG. 4A, in response to determining to refresh certificate public information within a managed certificate public information directory, the process 400 again transitions to the processing shown and described in association with FIG. 4B.

At block 442, the process 400 retrieves certificate public information for any changed digital certificate(s) from the separate digital certificate repository or repositories within which the respective digital certificate(s) are stored. At block 444, the process 400 refreshes the managed certificate public information directory with the updated public information. The process 400 returns to processing described in association with FIG. 4A at decision point 402 and iterates as described above.

As such, the process 400 dynamically creates a certificate public information directory in response to a variety of events. For example, the process 400 may autonomously create a certificate public information directory. Alternatively, the process 400 may dynamically create a certificate public information directory in response to a request for digital certificate public information. As another alternative, the process 400 may dynamically create a certificate public information directory during a migration operation of certificate public information from one or more remote certificate directors. The process 400 may extract certificate public information from locally managed certificate storage repositories and store the extracted certificate public information to the dynamically-generated certificate public information directory. The process 400 may also distribute digital certificate public information from a locally-managed certificate public information directory to one or more remote certificate directors.

FIG. 5 is a flow chart of an example of an implementation of a process 500 for application processing associated with dynamic generation and processing of certificate public information directories. For purposes of the present example, it is assumed that the application operates using asynchronous communications. However, it is understood that synchronous communications may also be implemented as described in association with the process 500.

Higher-level processing associated with the process 500 will be initially described followed by a description of processing associated with each higher-level decision point. At decision point 502, the process 500 makes a determination as to whether to send a communication to another application. In response to a determination to not send a communication to another application, the process 500 makes a determination at decision point 504 as to whether the communication has been received from another application. In response to determining that a communication has not been received from another application, the process 500 returns to decision point 502 and iterates as described above.

In response to determining at decision point 502 to send the communication to another application, the process 500 requests certificate public information from a certificate director for use in communicating with the other application at block 506. For example, for a communication that is to be encrypted, the application uses the public key of the intended recipient to encrypt the data for that particular recipient. As such, the application may request the respective public information (e.g., public key) from the respective certificate director. As described in association with FIG. 1 above, the certificate director may operate locally on the same computing device as the application that executes the process 500 or may operate on a remote computing device without departure from the scope of the present subject matter.

At decision point 508, the process 500 waits for a response that includes the requested certificate public information. In response to receipt of the requested certificate public information, the process 500 uses the received certificate public information to send the communication to the other application at block 510. The process 500 returns to decision point 502 and iterates as described above.

Returning to the description of decision point 504, in response to determining that a communication has been received from another application, the process 500 requests certificate public information from a certificate director at block 512. For example, for a communication that has been digitally signed, the application may verify the communication using the public key of the sender's certificate and possibly the issuer certificate (the certificate used to "sign" the sender's certificate). As such, the application may request the respective public information (e.g., public keys) from the respective certificate director. As described above, and as described in association with FIG. 1 above, the certificate director may operate locally on the same computing device as the application that executes the process 500 or may operate on a remote computing device without departure from the scope of the present subject matter.

At decision point 514, the process 500 waits for a response that includes the requested certificate public information. In response to receipt of the requested certificate public information, the process 500 processes the received communication using the received certificate public information at block 516. The process 500 returns to decision point 502 and iterates as described above.

As such, the process 500 provides for dynamic retrieval of certificate public information associated with communications between applications. The applications request the certificate public information to be used in association with the respective communications from a local or remote certificate director. As such, the applications do not have to process any accesses to digital certificate storage repositories or manage the logic associated with different digital certificate storage repository formats to asynchronously or synchronously communicate.

As described above in association with FIG. 1 through FIG. 5, the example systems and processes provide dynamic generation and processing of certificate public information directories. Many other variations and additional activities associated with dynamic generation and processing of certificate public information directories are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   receiving a request for digital certificate public information;
   accessing, via a processor in response to the request, at least one registry that identifies hosted digital certificate public information published by a plurality of distributed certificate management agents, where at least one of the plurality of distributed certificate management agents comprises a remote certificate management agent;
   determining, from the accessed at least one registry, whether a local digital certificate public information directory exists and stores the requested digital certificate public information;

extracting the requested digital certificate public information from at least one of the local digital certificate public information directory and at least one digital certificate stored within at least one digital certificate storage repository; and providing the requested digital certificate public information in response to the digital certificate public information request;

where, in response to determining that the local digital certificate public information directory does not exist, further comprising:

dynamically creating the local digital certificate public information directory; and storing the requested digital certificate public information within the dynamically-created local certificate public information directory to support additional digital certificate information requests.

2. The method of claim 1, where:

receiving the request for the digital certificate public information comprises receiving the request for the digital certificate public information from a local application; and dynamically creating the local digital certificate public information directory comprises dynamically creating the local digital certificate public information directory on a device local to the local application.

3. The method of claim 1, further comprising refreshing at least a portion of the digital certificate public information stored within the dynamically-created local digital certificate public information directory.

4. The method of claim 1, further comprising publishing the stored digital certificate public information to at least one of the at least one registry that identifies contents of the dynamically-created local digital certificate public information directory.

5. The method of claim 1, further comprising:

requesting, from a remote certificate director module at a remote device, digital certificate public information associated with at least one digital certificate stored within at least one remote dynamically-created digital certificate public information directory;

receiving, from the remote certificate director module, a distribution of digital certificate public information comprising at least the requested digital certificate public information associated with the at least one digital certificate stored within the at least one remote dynamically-created digital certificate public information directory; and storing the distribution of digital certificate public information to the dynamically-created local digital certificate public information directory.

6. The method of claim 1, further comprising:

providing a certificate query application programming interface (API) optimized for digital certificate public information storage and retrieval in association with the dynamically-created local digital certificate public information directory; and where the request for the digital certificate public information comprises a certificate query API request for at least one item of digital certificate public information received via the certificate query API.

7. The method of claim 1, where the at least one digital certificate storage repository comprises a plurality of digital certificate storage repositories and at least two of the plurality of digital certificate storage repositories comprise diverse types of storage repositories.

8. A system, comprising:
a memory; and
a processor programmed to:

receive a request for digital certificate public information;

access, in response to the request, at least one registry that identifies hosted digital certificate public information published by a plurality of distributed certificate management agents, where at least one of the plurality of distributed certificate management agents comprises a remote certificate management agent;

determine, from the accessed at least one registry, whether a local digital certificate public information directory exists and stores the requested digital certificate public information;

extract the requested digital certificate public information from at least one of the local digital certificate public information directory and at least one digital certificate stored within at least one digital certificate storage repository; and provide the requested digital certificate public information in response to the digital certificate public information request;

where, in response to determining that the local digital certificate public information directory does not exist, the processor is further programmed to:

dynamically create the local digital certificate public information directory; and store the requested digital certificate public information within the dynamically-created local certificate public information directory within the memory to support additional digital certificate information requests.

9. The system of claim 8, where:

in being programmed to receive the request for digital certificate public information, the processor is programmed to receive the request for the digital certificate public information from a local application; and in being programmed to dynamically create the local digital certificate public information directory, the processor is programmed to dynamically create the local digital certificate public information directory on a device local to the local application.

10. The system of claim 8, where the processor is further programmed to refresh at least a portion of the digital certificate public information stored within the dynamically-created local digital certificate public information directory.

11. The system of claim 8, where the processor is further programmed to:

request, from a remote certificate director module at a remote device, digital certificate public information associated with at least one digital certificate stored within at least one remote dynamically-created digital certificate public information directory;

receive, from the remote certificate director module, a distribution of digital certificate public information comprising at least the requested digital certificate public information associated with the at least one digital certificate stored within the at least one remote dynamically-created digital certificate public information directory; and store the distribution of digital certificate public information to the dynamically-created local digital certificate public information directory within the memory.

12. The system of claim 8, where the processor is further programmed to:

provide a certificate query application programming interface (API) optimized for digital certificate public information storage and retrieval in association with the dynamically-created local digital certificate public information directory;

publish the stored digital certificate public information to at least one of the at least one registry that identifies contents of the dynamically-created local digital certificate public information directory via the certificate query API; and where the request for the digital certificate public information request comprises a certificate query API request for at least one item of digital certificate public information received via the certificate query API.

13. A computer program product comprising a computer readable storage device including computer readable program code, where the computer readable program code when executed on a computer causes the computer to:

receive a request for digital certificate public information;

access, in response to the request, at least one registry that identifies hosted digital certificate public information published by a plurality of distributed certificate management agents, where at least one of the plurality of distributed certificate management agents comprises a remote certificate management agent;

determining, from the accessed at least one registry, whether a local digital certificate public information directory exists and stores the requested digital certificate public information;

extract the requested digital certificate public information from at least one of the local digital certificate public information directory and at least one digital certificate stored within at least one digital certificate storage repository; and provide the requested digital certificate public information in response to the digital certificate public information request;

where, in response to determining that the local digital certificate public information directory does not exist, the computer readable program code when executed on the computer further causes the computer to:

dynamically create the local digital certificate public information directory; and store the requested digital certificate public information within the dynamically-created local certificate public information directory to support additional digital certificate information requests.

14. The computer program product of claim 13, where:

in causing the computer to receive the request for digital certificate public information, the computer readable program code when executed on the computer causes the computer to receive the request for the digital certificate public information from a local application; and in causing the computer to dynamically create the local digital certificate public information directory, the computer readable program code when executed on the computer causes the computer to dynamically create the local digital certificate public information directory on a device local to the local application.

15. The computer program product of claim 13, where the computer readable program code when executed on the computer further causes the computer to refresh at least a portion of the digital certificate public information stored within the dynamically-created local digital certificate public information directory.

16. The computer program product of claim 13, where the computer readable program code when executed on the computer further causes the computer to:

request, from a remote certificate director module at a remote device, digital certificate public information associated with at least one digital certificate stored within at least one remote dynamically-created digital certificate public information directory;

receive, from the remote certificate director module, a distribution of digital certificate public information comprising at least the requested digital certificate public information associated with the at least one digital certificate stored within the at least one remote dynamically-created digital certificate public information directory; and store the distribution of digital certificate public information to the dynamically-created local digital certificate public information directory.

17. The computer program product of claim 13, where the computer readable program code when executed on the computer further causes the computer to:

provide a certificate query application programming interface (API) optimized for digital certificate public information storage and retrieval in association with the dynamically-created local digital certificate public information directory;

publish the stored digital certificate public information to at least one of the at least one registry that identifies contents of the dynamically-created local digital certificate public information directory via the certificate query API; and where the request for the digital certificate public information comprises a certificate query API request for at least one item of digital certificate public information received via the certificate query API.

\* \* \* \* \*